United States Patent [19]

Odaka

[11] Patent Number: 4,587,573

[45] Date of Patent: May 6, 1986

[54] CODED SIGNAL REPRODUCING APPARATUS

[75] Inventor: Kentaro Odaka, Tokyo, Japan

[73] Assignee: Sony Corporation, Tokyo, Japan

[21] Appl. No.: 612,959

[22] Filed: May 23, 1984

Related U.S. Application Data

[63] Continuation of Ser. No. 289,234, Aug. 3, 1981, abandoned.

[30] Foreign Application Priority Data

Aug. 6, 1980 [JP] Japan .................................. 55-107936

[51] Int. Cl.[4] .............................................. H04N 5/783
[52] U.S. Cl. .................................... 360/10.3; 360/19.1
[58] Field of Search ............... 358/312, 314, 339, 343; 360/8, 9.1, 10.1, 10.3, 36.1, 38.1

[56] References Cited

U.S. PATENT DOCUMENTS

| | | | |
|---|---|---|---|
| 3,909,512 | 9/1975 | Omori et al. | 360/8 |
| 4,020,291 | 4/1977 | Kitamura et al. | 360/8 |
| 4,138,694 | 2/1979 | Doi et al. | 360/8 |
| 4,141,039 | 2/1979 | Yamamoto | 360/8 |
| 4,215,376 | 7/1980 | Mach | 358/339 |
| 4,246,615 | 1/1981 | Shiraishi et al. | 360/8 |
| 4,280,147 | 7/1981 | Baldwin | 360/10.3 |
| 4,293,879 | 10/1981 | Heitmann et al. | 360/10.3 |
| 4,303,950 | 12/1981 | Taniguchi et al. | 360/8 |

*Primary Examiner*—Donald McElheny, Jr.
*Attorney, Agent, or Firm*—Hill, Van Santen, Steadman & Simpson

[57] ABSTRACT

A coded signal reproducing device for a video tape recorder wherein a PCM recorder is used for the audio signal and wherein sometime the VTR is set to variable speed reproducing mode for various purposes. The present invention utilizes a counter for counting a predetermined number of data in synchronization with a reference signal positioned between a vertical synchronizing signal and data in a coded signal having the format of a video signal reproduced at a different speed from the recording speed and a random access memory is utilized to store the data under the control of a counter and the data read out from the random access memory corresponds to the predetermined number of data for one vertical scanning period.

16 Claims, 5 Drawing Figures

(UNIT: H)

(UNIT: BIT)

(UNIT: BIT)

CODED SIGNAL REPRODUCING APPARATUS

This is a continuation of application Ser. No. 289,234, filed Aug. 3, 1981, now abandoned.

BACKGROUND OF THE INVENTION

1. Field of the Invention

This invention relates in general to a coded signal reproducing device for a video tape recorder and particularly it is suitable for application to a PCM recorder wherein a coded audio signal is recorded and reproduced using a video tape recorder.

2. Description of the Prior Art

In a PCM recorder wherein an audio signal is subjected to PCM conversion, and then recorded and reproduced by VTR and demodulated to obtain the audio signal, the VTR will sometimes be set at variable speed reproducing modes for obtaining a heading signal contained in the recorded audio signal sources. For tape dubbing, also the VTR will sometimes be set to a high speed reproducing mode.

In such variable speed reproducing modes, if a reproduced PCM signal is demodulated, the pitch of the voice will be changed thus making it impossible to discriminate voice signals so the speed change ratio cannot be varied to a large extent. So as to avoid this inconvenience, a random access memory has been utilized for expanding the time base of a reproduced PCM signal into normal state by controlling the write and read clock frequencies so as to obtain the reproduced sound. According to this method, it is required that a longer time be utilized to read out the information from the RAM than was required in the writing operation which results in loss in information with respect to the reproduced information. The amount of information which must be received is reduced at a ratio corresponding to the time base expansion according to the playback speed ratio. Also, when the two rotational head type VTR is used at high speed reproducing mode such as during picture search modes, for example, as one of the rotational heads (A-head) scans across plural B-tracks recorded with another head (B-head) having a different azimuth with respect to the A-head, the RF output from the head will fall periodically and drop out becomes very noticeable. For such reproduced signals, the error-detecting and error-correcting operation in a PCM signal processor will not longer be assured, thus causing abnormal sound and clicks to be generated.

SUMMARY OF THE INVENTION

It is an object of the present invention to eliminate the drawbacks of the prior art.

Other objects, features and advantages of the invention will be readily apparent from the following description of certain preferred embodiments taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
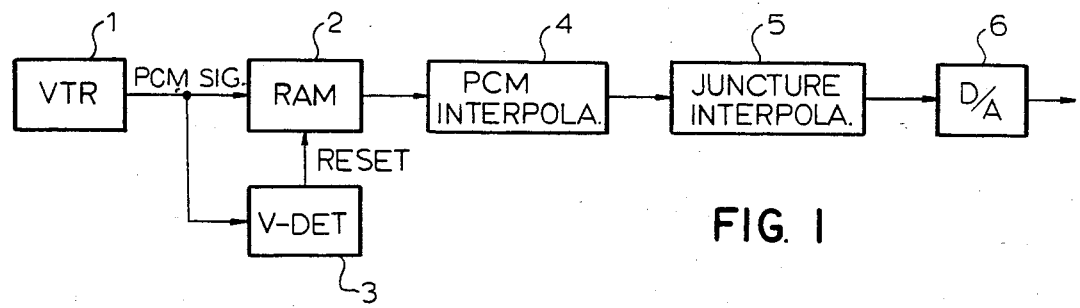
FIG. 1 is a block diagram of a processing circuit for a reproduced PCM signal according to the invention.

FIG. 1 illustrates a standard rotary head video tape recorder (VTR) 1 with slant tracks which produces an output audio PCM signal which was recorded on a magnetic tape in a speed varied playback mode. By changing the tape running speed without changing the drum rotational speed of the VTR 1 skipping of tracks will occur which permits high speed search for the start of a desired recorded program.

Figure 3A:
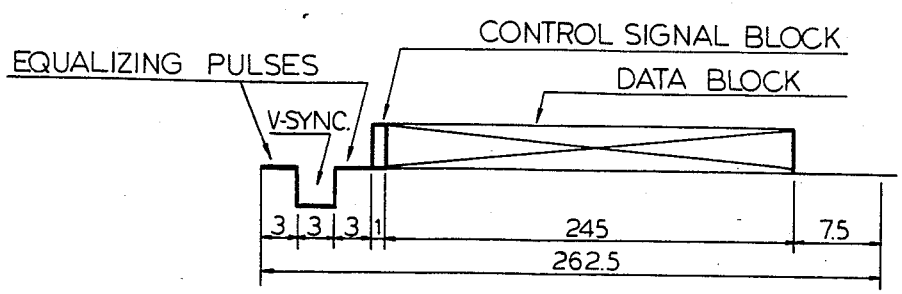
FIGS. 3A, 3B and 3C illustrate different recording formats of a PCM signal for explaining the invention.
Figure 3B:
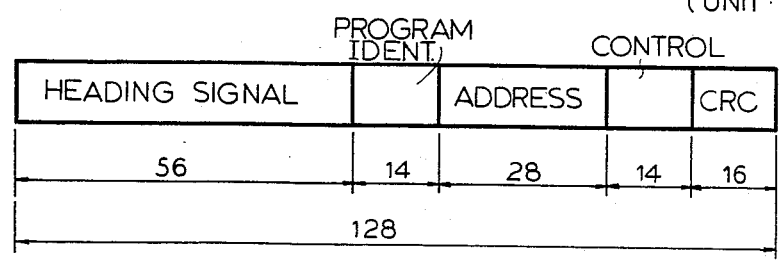

FIG. 3A illustrates an example of a recording format of the PCM signal in one vertical scanning period. In one horizontal period, 1 H after a vertical synchronizing signal and equalizing pulses, there is inserted a control signal block and during the subsequent 245 H period there is inserted the PCM data. FIG. 3B illustrates the content of the control signal block. The signal block is composed of a 56-bit heading signal or a que signal, a 14-bit program contents identification signal, a 28-bit editing address signal, a 14-bit control signal and a 16-bit CRC code signal.

Figure 3C:
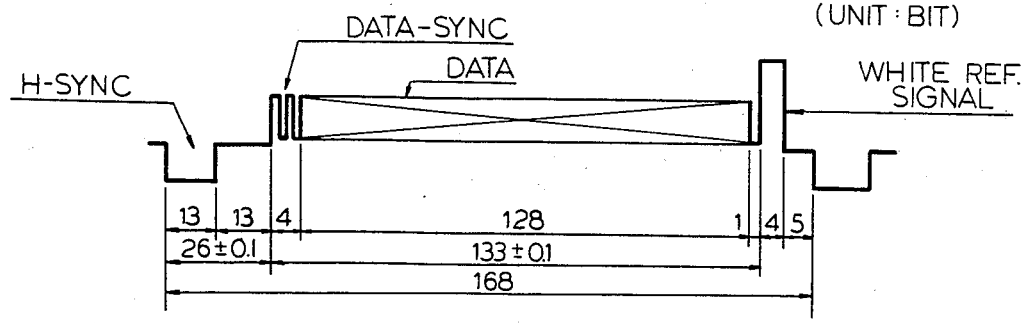

FIG. 3C illustrates a recording format of the PCM signal in each horizontal period in which a 4-bit data synchronizing signal is added after a horizontal synchronizing signal and during the subsequent 128-bit period there is inserted PCM data which is composed of a PCM signal for the L and R channels and each include three words and error-correcting bits and CRC bits. Each data word is interleaved so that continuous data drop-out will not occur during reproduction.

Figure 2:
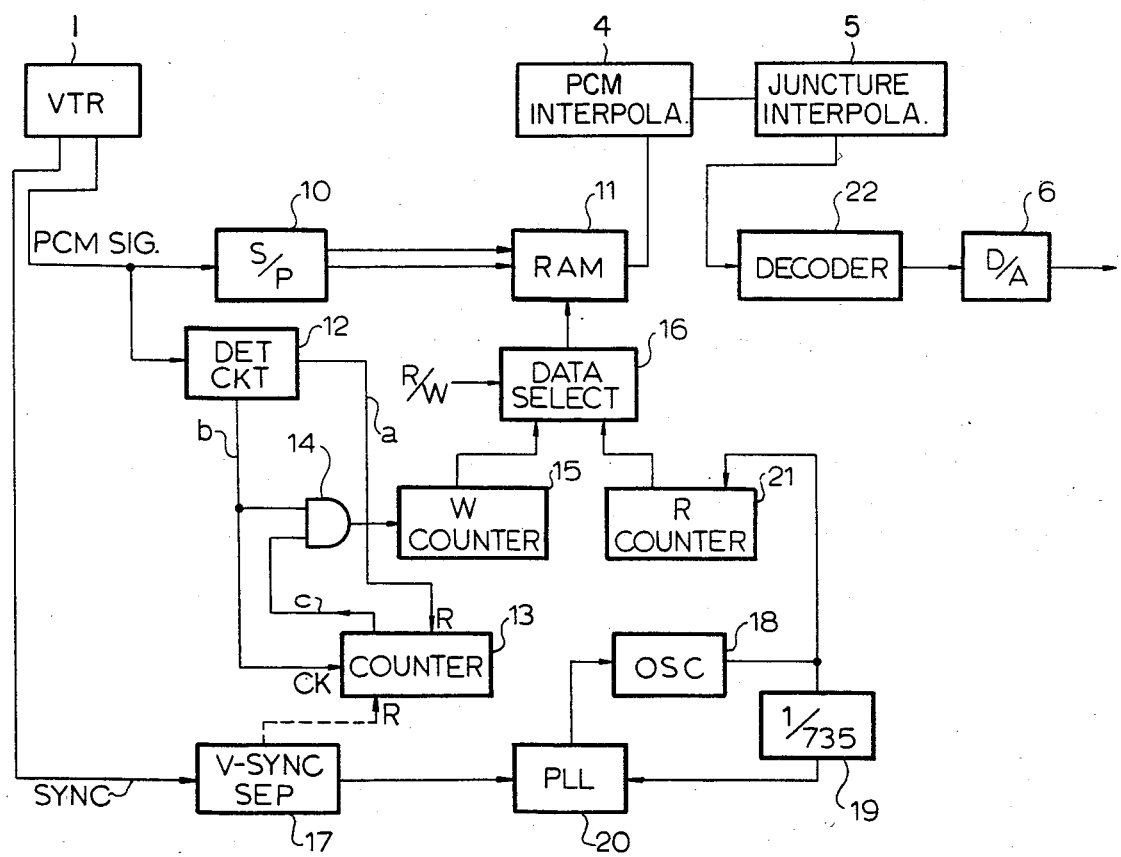
FIG. 2 is a detailed block diagram of a time base companding RAM circuit illustrated in FIG. 1.

In case a variable speed reproducing operation is done by the VTR 1 illustrated in FIG. 1, the rotary head scans across plural tracks so that the reproduced PCM signal will comprise a train of discontinuous blocks each having a period of one frame period to several horizontal scanning periods. For example, in a A-head reproducing operation, the juncture between blocks is at a position across tracks of different azimuth formed by a B-head, so that drop-out becomes more conspicuous because of a decrease of the head output. Since there can be a case where some vertical synchronizing signals will be positioned during the drop-out period, the synchronizing signal is replaced by a reference vertical synchronizing signal as a pseudo signal and thereafter a reproduced PCM signal will be output in the form of a complete television signal as shown in FIG. 2.

The reproduced PCM signal obtained from the VTR 1 is written into a RAM 2 which has not only the function of companding the time base of a signal reproduced at a different speed but also the function of deinterleaving the interleaved data. The reproduced PCM signal is fed also to a vertical synchronizing signal detection circuit 3 in which the pseudo vertical synchronizing signal in the reproduced PCM signal is detected. Furthermore, a heading signal in the control block spaced by a predetermined interval from the pseudo vertical synchronizing signal is also detected in the vertical detector 3. The heading signal is fed as a reset pulse to the reset terminal of the RAM 2 and in synchronism therewith there are written into the RAM 2 only a normal number of 245 data bits in one vertical period from the heading signal. Therefore, even if the horizontal frequency changes to 280 H from the normal 262.5 H for each vertical period during high speed reproducing mode, the normal number of data will be recorded in the RAM.

The storage contents of the RAM 2 are read out with the time base being expanded to 1 V period (1 V=245 H), and at the same time the interleaved data are deinterleaved. The output of the RAM 2 is fed to a PCM interpolation circuit 4. As noted previously, the PCM signal during a high speed reproducing mode contains a large amount of drop-out and it is impossible to expect normal operation of the signal processing circuit which operates on the basis of error-detecting and error-correcting bits. Therefore, in the interpolation circuit 4, there is performed only interpolation based on data proceeding and succeeding by one word from the error word.

The output of the interpolation circuit 4 is fed to a juncture interpolation circuit 5 in which there is performed interpolation of data at the juncture between blocks of the reproduced signal extending over plural tracks. The interpolation circuit 5 may be a circuit which replaces the juncture portion by a mean value of data or a waveform smoothing circuit such as a pre-data holding circuit of a digital filter. The output of the juncture interpolation circuit 5 is fed to a D-A converter 6 where it is converted to an analog signal and then is fed to an output detecting device.

The RAM circuit 2 of FIG. 1 will be described in more detail in FIG. 2 which includes a number of additional components. The PCM signal from the VTR 1 illustrated in FIG. 1 is written into the RAM 11 after passing through a series-parallel conversion circuit 10 which allows information to be stored at different addresses. The reproduced PCM signal is fed also to a heading signal detection circuit 12 in which a heading signal a in the control signal block illustrated in FIG. 3A is detected on the basis of the pseudo vertical synchronizing signal in the reproduced signal. The detection circuit 12 corresponds to the vertical synchronizing signal detection circuit 3 illustrated in FIG. 1. From the detection circuit 12, there is obtained a data synchronizing signal b (see FIG. 3C) inserted before data in each horizontal period, or a horizontal synchronizing signal. The heading signal a and the horizontal synchronizing signal or the data synchronizing signal b are supplied to a counter 13 with the signal a being supplied to the reset terminal of the counter and the other signal comprising a clock pulse. From the output of the counter 13 there is formed a strobe signal c which is at a higher level by the 245 H period from the heading signal and this signal c is fed to one input of an AND gate 14.

The other input of the AND gate 14 receives the data synchronizing signal b in the horizontal period or the horizontal synchronizing signal so that only during the period of the strobe signal c corresponding to 245 H will the data synchronizing signal b be fed to a write address counter 15. The output of the address counter 15 is fed to an address input of the RAM 11 through a data selector 16 which is controlled with read/write control signals R/W so that the reproduced PCM signals of the 245 H period will be stored in their corresponding address in the RAM 11.

During the read cycle of the RAM 11, first a vertical synchronizing signal will be separated from the reproduced signal or a reference synchronizing signal SYNC in a vertical synchronizing signal separation circuit 17 and in synchronism with this vertical synchronizing signal a clock signal of 44.1 kHz is formed by an oscillator 18. The circuit 17 receives an input from said VTR 1. The frequency of the output of the oscillator 18 is divided to 60 Hz by a 1/735 frequency divider 19 and fed to a PLL circuit 20 where its phase is compared with the phase of the vertical synchronizing signal from the vertical SYNC separating circuit 17 and depending on the results of the comparison and the output frequency of the oscillator 18 is controlled by the output of the circuit 20. Since three words of data are inserted in one horizontal period, 735 words are contained in one vertical period. Thus, so as to expand the 245 H data period to 1 V period (vertical period), the clock frequency corresponding to one word should be $735 \div 1/60 = 44.1$ kHz.

The output of the oscillator 18 is fed to a read address counter 21 in which there is formed a read address signal. The output of the counter 21 is supplied through the data selector 16 to the address input of the RAM 11 and a PCM signal is read out from the RAM 11. The output of the RAM 11 passes through the PCM interpolation circuit 4 and the juncture interpolation circuit 5 as illustrated in FIG. 1 and then is transmitted through a decoder 22 to the D-A converter 6.

In FIG. 2, a construction may be adapted such that a pseudo vertical synchronizing signal in the reproduced signal will be extracted in the vertical synchronizing signal separation circuit 17 and on the basis of such vertical synchronizing signal, a predetermined reset pulse will be formed and fed as a reset signal to the counter 13 thus to form a signal corresponding to the 245 H data period.

According to the invention, a predetermined number of data are counted in synchronizm with a reference signal positioned between a vertical synchronizing signal and data in a reproduced signal obtained in a different speed reducing mode and the data are written into a RAM and the data is read out while compressing or expanding the time base of the data to one vertical scanning period. Consequently, even if the reproduced horizontal frequency changes in a different speed reproducing mode, a normal number of data inserted in one vertical scanning period can be stored and by changing the time base of the extracted data and demodulation to an audio signal it is possible to effect an audio monitor of a relatively high quality. Consequently, it becomes possible to accomplish heading of a recorded source during high speed reproducing modes.

Although the invention has been described with respect to preferred embodiments, it is not to be so limited as changes and modifications can be made which are within the full intended scope of the invention as defined by the appended claims.

I claim as my invention:

1. A circuit for storing and reproducing pulse code modulated signals from a video tape recorder which is operated at speeds other than normal speeds comprising, a random access memory which receives the pulse code modulated signal from said video tape recorder, a detector circuit receiving the output of said video tape recorder and producing a reset signal and a counter drive signal, a first counter receiving said reset and counter drive signals from said detector circuit, a gate means controlled by the output of said first counter and said counter drive signal from said detector circuit, a second write counter receiving the output of said gate means and supplying a write input to said random access memory to control the quantity of data stored therein and audio detecting means connected to the output of said random access memory.

2. A circuit for storing and reproducing according to claim 1 including a series to parallel converter connected between said video tape recorder and said random access memory.

3. A circuit for storing and reproducing according to claim 2 including, a vertical SYNC separation circuit receiving a vertical SYNC signal from the video tape recorder, a phase lock loop circuit receiving the output of said vertical sync separation circuit, an oscillator receiving the output from and controlled by said phase loop lock circuit, a divider connected to the output of said oscillator and supplying an input to said phase lock loop circuit, and a third read counter receiving the output of said oscillator and supplying an output to said random access memory.

4. A circuit for storing and reproducing according to claim 3 wherein said divider divides the output of said oscillator by 735.

5. A circuit for storing and reproducing according to claim 4 including a pulse code interpolator connected between said random access memory and said audio detecting means.

6. A circuit according to claim 5 including a juncture interpolator connected between said pulse code interpolator and said audio detecting means.

7. A circuit according to claim 6 including a digital to analog converter connected between said juncture interpolator and said audio detecting means.

8. A circuit according to claim 6 including a decoder connected between said juncture interpolator and said digital to analog converter.

9. A circuit according to claim 8 including a data selector circuit connected to receive the outputs of said second write counter and said third read counter and to supply its output to said random access memory.

10. A coded signal reproducing system for reproducing pulse code modulated signal from a recording medium in which PCM data and reference signals are recorded at a normal speed on slant tracks for a rotary head tape recorder, comprising said rotary head recorder producing said PCM data together with said reference signals, a detecting circuit receiving the output of said rotary head recorder and detecting said reference signals and producing outputs, a random access memory receiving the output of said rotary head recorder and in which said PCM data are to be written and read out under the control of a read and write address circuit, a counter circuit receiving outputs of said detecting circuit and counting a predetermined number of said PCM data, said predetermined number being equal to the number of data recorded in one synchronizing period of said PCM data at the normal speed and said predetermined number of PCM data being written in said random access memory, said counter circuit connected to said random access memory and data read out of said random access memory so as to compress or expand the time base of said predetermined number of PCM data to one synchronizing period.

11. A coded signal reproducing system according to claim 10, said PCM data includes a coded audio signal.

12. A coded signal reproducing system according to claim 10, said PCM data and reference signal are of the format of a video signal and said synchronizing period is defined by a vertical synchronizing signal, wherein said counter circuit includes a reference signal detecting circuit provided with said PCM signal so as to detect said reference signal, and a counter which is fed with said reference signal.

13. A coded signal reproducing system according to claim 12 wherein said reference signal is a heading signal inserted in each control signal block attached to every vertical synchronizing period, and said counter counts data synchronizing signals or horizontal synchronizing signals which are included in each horizontal period of said reproduced video signals as clock pulses and said counter is reset by said detected heading signal and counts said predetermined number of data and produces a strobe signal having a width corresponding to the period of said predetermined number of data which is supplied to said random access memory.

14. A coded signal reproducing system according to claim 12 wherein said data synchronizing signals or horizontal synchronizing signals are signals which are fed to a write address counter included in said read and write address circuit for generating write address data corresponding to said predetermined number of data for the random access memory.

15. A coded signal reproducing apparatus for reproducing pulse code modulated signals at a different tape speed other than a normal recording tape speed from a tape recording medium in which a first predetermined number of PCM data and first reference signals being associated with a second predetermined number of said PCM data, at least a second reference signal being associated with a third predetermined number of said first reference signals are recorded on every slant track by means of a rotary head (like a video tape recorder), comprising, an input terminal provided with a reproduced signal including said PCM data together with first and second reference signals reproduced from said tape recording medium, an output terminal which supplies said first predetermined number of PCM data in one synchronizing period, a random access memory connected to said input terminal and said output terminal and having a write address circuit which receives a clock signal corresponding to said reproduced PCM signal so as to produce write addresses which are to be written with said PCM data therein and a read address circuit to produce read addresses to be read with said first predetermined number of PCM data thereout (while compressing or expanding the time base of said first predetermined number of PCM data in one synchronizing period), a detecting circuit connected to said input terminal for detecting said first and second reference signals, a control circuit connected with said detecting circuit and for producing a control signal to be supplied to a write address circuit so as to control said write address circuit to prevent a number of said PCM data written in said random address memory from exceeding said first predetermined number corresponding to said normal recording tape speed, even if more than said first predetermined number of said PCM data are reproduced at said different tape speed.

16. A coded signal reproducing apparatus for reproducing pulse code modulated signals at a different tape speed other than a normal recording tape speed from a tape recording medium in which PCM data and reference signals are recorded on slant tracks by means of a rotary head like a video tape recorder, comprising, an input terminal provided with a reproduced signal including said PCM data together with first and second reference signals reproduced from said tape recording medium, said first reference signals being associated with a first predetermined number of said PCM data, and said second reference signals being associated with a second predetermined number of said first reference signals, a detecting circuit connected to said input terminal for detecting said first and second reference signals, a counter circuit connected to said detecting circuit and counting a number of said first reference signals in synchronism with said second reference signals so as to produce a control signal when said number of said first reference signals corresponds to a third predetermined number of said PCM data, said third predetermined number being equal to the number of data recorded in one synchronizing period of said PCM data at said normal recording tape speed and a random access memory connected to said input terminal and to an output terminal and having a write address circuit which receives a clock signal corresponding to said reproduced signal and said control signal from said counter circuit so as to produce write a control circuit connected to said detecting circuit and producing a control signal supplied to a write address circuit so as to control said write address circuit so that the number of said PCM data written in said random address memory does not exceed said first predetermined number corresponding to said normal recording tape speed, even when said first predetermined number of said PCM data are reproduced at said different tape speed.

* * * * *